ANALOG TO DIGITAL TO OPTICAL PHOTOGRAPHIC RECORDING AND PLAYBACK SYSTEM

Filed Sept. 1, 1966 3 Sheets-Sheet 1

JAMES T. RUSSELL
INVENTOR
BY
BUCKHORN, BLORE, KLARQUIST & SPARKMAN
ATTORNEYS

JAMES T. RUSSELL
*INVENTOR*
BY
*BUCKHORN, BLORE, KLARQUIST & SPARKMAN*
*ATTORNEYS*

JAMES T. RUSSELL
*INVENTOR*
*BY*
*BUCKHORN, BLORE, KLARQUIST & SPARKMAN*
*ATTORNEYS*

United States Patent Office

3,501,586
Patented Mar. 17, 1970

3,501,586

ANALOG TO DIGITAL TO OPTICAL PHOTOGRAPHIC RECORDING AND PLAYBACK SYSTEM

James T. Russell, Richland, Wash., assignor to The Battelle Development Corporation, Columbus, Ohio, a corporation of Delaware

Filed Sept. 1, 1966, Ser. No. 576,580
Int. Cl. H04n *5/84*
U.S. Cl. 178—6.7 16 Claims

ABSTRACT OF THE DISCLOSURE

A signal recording and playback system is described in which an analog input signal is converted to a digital signal that pulses a light source to form a single, series-recorded track of binary coded digital information on a photographic film which is played back in a similar manner. The photographic film is a compact, permanent record of long, useful lifetime which may be photographically copied to provide a plurality of inexpensive copies. A spiral track photographic record is used in one embodiment which can be employed to provide a music system of high quality.

The subject matter of the present invention relates generally to the storage and retrieval of information at extremely high densities, and in particular to apparauts for optically recording a digitally encoded electrical signal in series on a photosensitive element with a single pulsed light source focused to an extremely small focal spot and for optically playing back the recorded digital signal with a light detector.

Briefly, one embodiment of a system in accordance with the present invention includes a recorder unit by which an analog input signal is converted into a digital electrical signal which pulses a single light that is optically scanned across a photosensitive plate to record the pulses of such digital signal in series as a single track of digitally coded spots on such plate. A playback unit is then employed to optically scan the photo record of the recorded digital signal with a photocell to produce a digital electrical readout signal and to convert such digital readout signal into an analog output signal that is an accurate reproduction of the analog input signal.

The apparatus of the present invention is especially useful for recording and playing back audio-visual analog signals, such as television video signals, high fidelity music audio signals, and other electrical analog signals. However, it is also possible to employ the present apparatus as part of a character recognition system or a photograph inspection system in which the audio-visual analog input signal is a light signal which is converted into a digital electrical signal that is optically recorded and played back by the apparatus of the present invention.

Previous attempts to optically record and/or playback an audio signal by means of a light beam have been commercially unsuccessful. Some of these prior apparatus have employed a light beam and photocell merely to play back a conventional phonograph record by reflecting light from the groove of such record, as shown in U.S. Patent 3,138,699 of J. Rabinow et al. Recently attempts have also been made to record an audio signal by means of a light beam as a photographic track of varying light density, as well as optically playing back the photographic record so produced, as shown in U.S. Patent 3,251,952 of A. Shomer. However, in both instances an analog signal, rather than a digital signal, is recorded so that the amount of information which can be stored, as well as the quality of the signal reproduced during playback, is severely limited. It has been discovered that these disadvantages can be overcome if the analog signal is first converted into a digital signal before optically recording such signal as a track of light spots on a photosensitive medium in accordance with the present invention.

It has also previously been proposed to optically record and playback digitally encoded information on a photographic film to improve the transmission of speech signals over telephone lines by means of pulse code modulation, as shown in U.S. Patent 2,595,701 of R. K. Potter. However this system employs a plurality of light sources which are selectively energized by means of an electronic switching device in the form of a cathode ray tube so that the resulting photograph has a very low information density, which necessitated the use of a moving film strip as the photosensitive record. This disadvantage has been overcome in the apparatus of the present invention by employing a single pulsed light source focused to an extremely small focal spot, for example of about 1/300 millimeter in diameter, which is optically scanned across the photosensitive recording medium to produce a track of digitally recorded light spots having a very high density of up to approximately $5 \times 10^{-7}$ bits per square inch.

The information storage and retrieval system of the present invention has several advantages over systems previously employed. Thus the present apparatus is less expensive than the video signal magnetic tape recording equipment. Also it producee a photograph type of record which can be easily reproduced inexpensively to provide high quality copies and which has a much longer useful lifetime than magnetic tape or phonograph records. In addition, the present digital coded photographic record is capable of storing a larger amount of information in a smaller space. Furthermore, by employing a digital light signal to photographically record the information the present apparatus provides a much higher signal-to-noise ratio in the analog output signal to enable a better quality reproduction of the analog input signal. Also the analog output signal quality is more consistent because it is less dependent upon the recording medium, or the frequency response of the recording and playback devices. In addition the present photographic records may be produced on flat plates which enables the use of an automatic record changing device similar to that used on a photo slide projector or phonograph.

It is therefore one object of the present invention to provide an improved information storage and retrieval system for optically recording and playing back digitally encoded electrical signals on a photosensitive medium at an extremely high information density.

Another object of the present invention is to provide a system for converting an analog input signal into a digitally encoded electrical signal and photographically recording such digital signal with a pulsed light source focused to a very small focal spot, and for optically scanning the resulting photograph with a light detector to produce a digitally encoded electrical readout signal which is subsequently converted into an analog output signal that has a high signal-to-noise ratio and is a high quality reproduction of the analog input signal.

A further object of the present invention is to provide an improved digital signal recorder unit for optically recording a digitally encoded electrical signal on a photosensitive medium in the form of a single track of a series of light spots of extremely small size and high density per unit area.

Still another object of the present invention is to provide an improved optical scanner apparatus employing a rotating mirror which is radially deflected electromagnetically and by centrifugal force in order to provide a spiral shaped scan pattern and which is capable of scanning a flat photographic element while maintaining the optical path length substantially constant at all times during the scan.

An additional object of the present invention is to provide an improved digital signal playback unit for optically scanning a photograph of a track of digitally encoded spots with a light detector to produce an electrical digital readout signal corresponding thereto in an accurate and inexpensive manner.

A still further object of the present invention is to provide a photographic record element having a track of digitally encoded light spots recorded thereon at an extremely high density to provide a record which is inexpensive, compact, of long useful lifetime, and easily reproduced to provide copies of very high quality.

Other objects and advantages of the present invention will be apparent from the following detailed description of certain preferred embodiments thereof and from the attached drawings of which:

Figure 1:
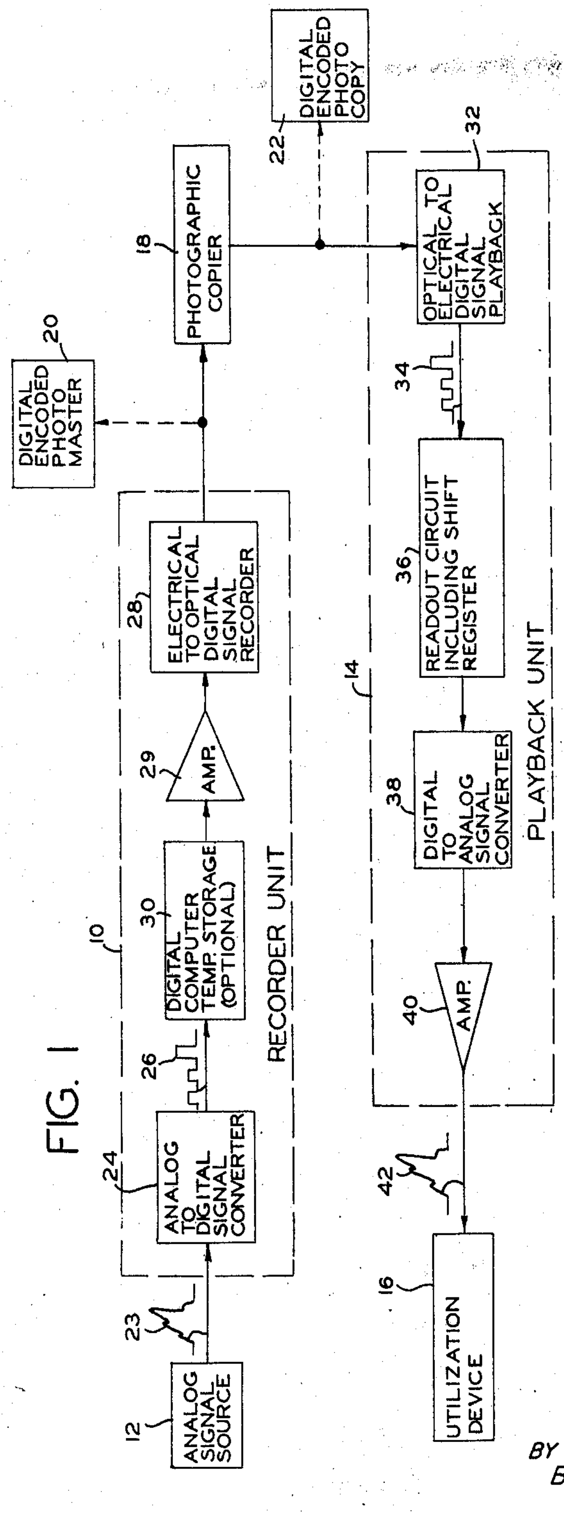
FIG. 1 is a block diagram of the analog to digital to optical recording and playback system of the present invention.

As shown in FIG. 1, the information storage and retrival system of the present invention includes a recorder unit 10 having its input connected to an audio-visual analog signal source 12, such as a microphone or television camera, and a playback unit 14 having its output connected to an analog signal utilization device 16, such as a loud speaker, television receiver, cathode ray oscilloscope, mechanical recorder, etc. In addition, a photographic copier 18 of any suitable type, such as that capable of making contact prints, may be provided so that a single digitally encoded photomaster 20 produced by the recorder unit 10 may be inexpensively copied and reproduced as a plurality of digitally encoded photocopies 22 which are employed as the information input to the playback unit 14. In this regard the system of the present invention is similar to that of a commercial photograph recording apparatus which produces a large number of photograph records from a single master so that such copy records may be sold to the consumer at a relatively low cost.

The signal source 12 produces an audio-visual analog input signal 23 which may be an audio high fidelity music signal or a video television signal. This analog input signal is applied to the input of an analog to digital signal converter 24 provided in the recorder unit 10 and which produces a digitally encoded electrical output signal 26. However, it is also possible that the signal source 12 and the converter 24 may be of the type which convert a light analog input signal into a digital electrical output signal, such as is employed in character recognition systems and aerial photograph analyzers. The digital signal 26 is produced by conventional pulse code modulation in the form of a plurality of pulses separated into groups or "words" of pulses, each group corresponding to the instantaneous amplitude of a different portion of the analog input signal 23. The output of the analog to digital signal converter 24 may be directly connected to an electrical to optical digital signal recorder 28 through an amplifier 29 if it is desired to record the digital signal in real time simultaneously as it is generated. However, it may be desirable to temporarily store the digital signal 26 on the magnetic tape of a digital computer 30 and to record such signal later at a more convenient time. Thus it can be seen that the digital computer 30 connected between signal converter 24 and amplifier 29, is an optional part of the recorder unit.

The electrical to optical digital signal recorder 28 converts the digital electrical signal into a digital light signal and photographically records such light signal by scanning a pulsed light beam of small focal spot size over a photosensitive element to produce a track digitally encoded spots of less than about .01 millimeter in diameter. When a binary digital signal is employed, the spots may be light opaque or light transparent to provide the 0 and 1 bits of the binary code. It should be noted, however, that other digital encoded signals can be employed, such as a ternary digital system employing transparent, partially transparent and opaque dots on black and white film, and the like.

The playback unit 14 includes an optical to electrical digital signal playback apparatus 32 which scans a photocell across the digitally encoded photocopy 22 to produce a digitally encoded electrical signal 34 corresponding to the photograph of digitally encoded light spots. Thus the digital output signal 34 corresponds to the digital input signal 26 supplied to recorder 28. While the optical playback apparatus 32 is shown separate from the optical recorder apparatus 28, it may employ the same optical scanner and merely substitute a photocell in place of the pulsed light source used in such recorder. The optical playback apparatus 32 is connected through an electrical readout circuit 36 including a shift register to a digital to analog signal converter 38. The output of the signal converter 38 is connected to the utilization device 16 through an amplifier 40 so that an analog output signal 42 produced by such signal converter in response to digital signal 34, is applied to the utilization device. Thus the analog output signal 42 is a high quality reproduction of the analog input signal 23, such output signal having a high signal-to-noise ratio and very little distortion. This high quality signal reproduction and the high information density on the photographic record are due to the fact that the grain size and the nonlinear optical density curves of photosensitive materials do not limit the recorded information density of digital signals as they do with analog signals.

Figure 2:
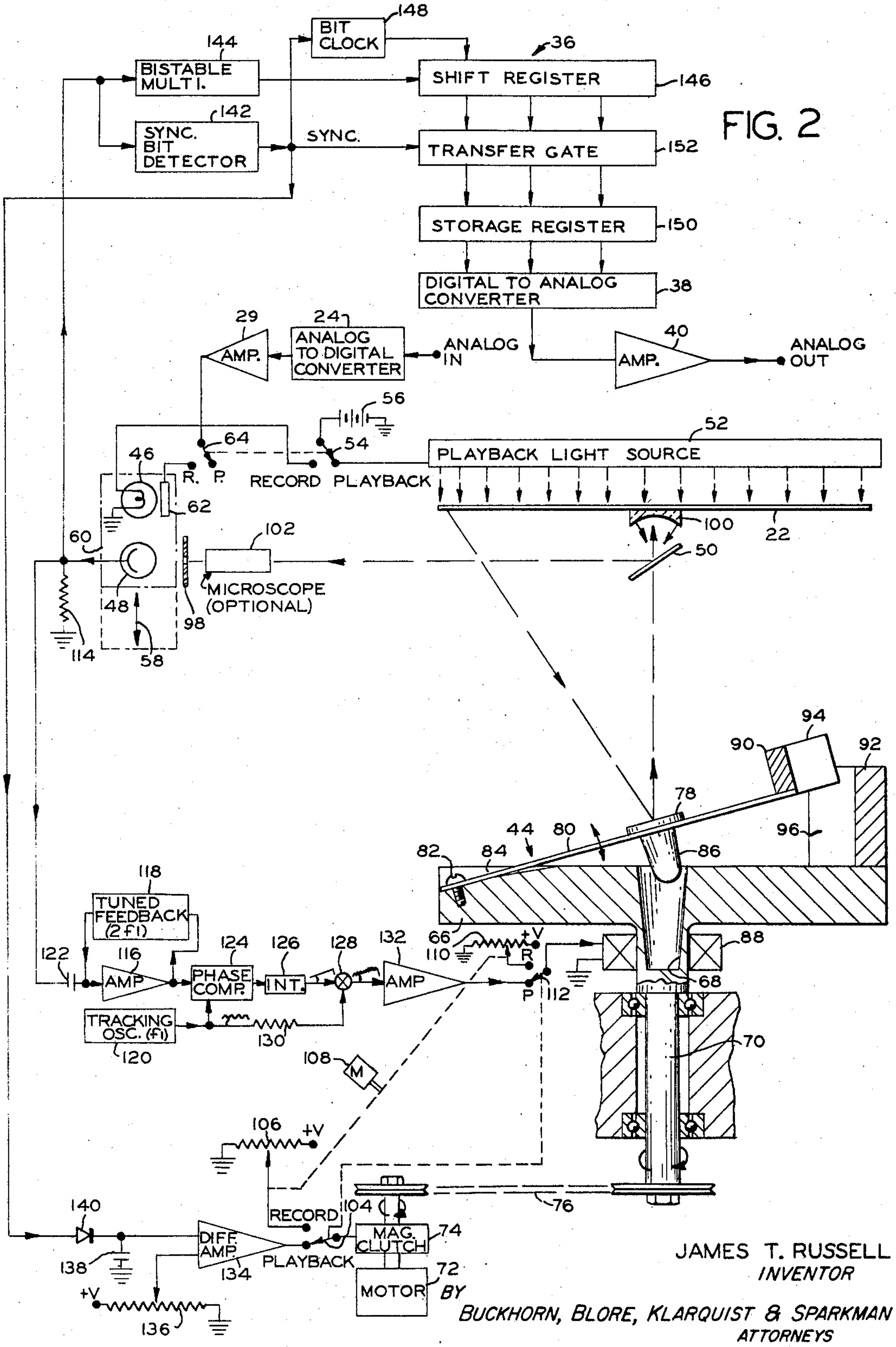
FIG. 2 is a partially schematic diagram of one embodiment of the system of FIG. 1, which employs an optical scanner having a magnetically deflected rotating mirror.

As shown in FIG. 2, one embodiment of the recording and playback system of FIG. 1 may employ the same optical scanner apparatus 44 for both the optical recorder 28 and the optical playback apparatus 32 merely by moving either a recording light source 46 or a photocell 48 into alignment with a beam splitting mirror 50 employed with such apparatus. The recording light source is a single light source of high intensity and small area, such as an arc lamp or a laser. In addition, a playback light source 52 of large area, which may be a bank of fluorescent lights, is positioned behind the digital encoded photocopy 22 and selectively energized by a switch 54 connected to a source of electrical power 56 which is represented by a battery but may actually be any D.C. voltage source, in the "playback" position of such switch. It should be noted that while the playback light source 52 is shown transmitting light though the digitally encoded photocopy 22, it may be reflected from such photocopy if the light source is positioned in front of the photocopy out of the path of the scanning light beam, such as by employing a circular fluorescent lamp surrounding the photocopy. In the "record" position of switch 54, the recording light source 46 is energized to enable recording of the digital information when the light source is moved in the direction of arrows 58 into the position occupied by the photocell 48, by the downward movement of a carriage 60 supporting both such light source and photocell.

While the digital encoded input signal produced by signal converter 24 of the record unit 10 may instead be applied directly to the light source 46, such signal is shown being applied to an electronic shutter 62 in front of such light source to produce a beam of light pulses. Shutter 62 may be a Kerr cell which contains nitrobenzene liquid, or may be a series of crystals of potassium dihydrogen phosphate, both such Kerr cell and such crystals having the property of electric double refraction. Thus shutter 62 is connected to the output of amplifier 29 by a two position selector switch 64 whose movable contact is ganged to that of switch 54 so that such switch is open in the "playback" position shown and closed in the "record" position. If such a shutter is employed, light source 46 may be a continuously operating laser to provide an intense source of collimated monochromatic light.

The optical scanner apparatus 44 includes an annular support plate 66 of aluminum or other nonmagnetic material having an axially extending cavity 68 and which is mounted for rotation on shaft 70. The shaft 70 is rotated about a vertical axis by a constant speed electric motor 72 which is connected through a magnetic clutch 74 and a belt drive 76 to such shaft. A flat mirror element 78 is attached to the upper side of a leaf spring 80 intermediate the ends of such spring and one end of the spring is fixed to the periphery of the support plate 66 by a screw 82 or other suitable means. Spring 80 extends through a guide slot 84 provided in the upper surface of plate 66 and intersects the axis of rotation of shaft 70 so that the center of the scanning mirror 78 is positioned generally on such axis of rotation. A solenoid element 86 of magnetic material is attached to the bottom side of the spring 80 beneath mirror 78 in position to be inserted into the cavity 68 in support plate 66 when such spring is deflected downward. Both cavity 68 and solenoid element 86 are of a frustoconical shape. An electromagnetic coil 88 is positioned about the shaft of the rotating support plate 66 adjacent the bottom of caviy 68 so that when an electrical signal is applied to such coil the solenoid element 86 is attracted into such cavity or repelled out of the cavity due to the magnetic field produced by such coil. This causes deflection of the spring 80 and radial scanning movement of the mirror 78 over the digitally encoded photocopy 22.

In addition a weight 90 is attached to the free end of the spring 80 in order to cause such spring to deflect downwardly due to the centrifugal force on such weight when the speed of rotation of support plate 66 is increased. In order to dampen the oscillations of spring 80 a slotted permanent magnet 92 is attached to the upper surface of the rotating support plate 66 and a thin vane 94 of electrically conductive material provided on the end of weight 90 is positioned within the slot 96 of such magnet so that such vane moves up and down between the north and south poles of the magnet, which produce eddy currents in vane 94 to cause a damping action. In place of such permanent magnet damping, it is also possible to employ oil damping by filling cavity 68 with oil so that solenoid element 86 operates in the manner of a dash pot.

As stated previously, a beam splitter mirror 50 which transmits about 50 percent and reflects about 50 percent of the light directed onto such splitter, is positioned at an angle of 45° with respect to the axis of rotation of shaft 70 and with respect to the axis of the light path between such mirror and an apertured light mask 98 positioned in front of the photocell 48 or the light source 46, 62. A spherical mirror 100 is positioned between the beam splitter 50 and the center of the photosensitive element

22. In addition, a light microscope 102 may be provided between the mask 98 and the beam splitter 50 in order to focus the light source into a small diameter spot on the record element 22 or to limit the viewing field of the detector to such a small spot. However, the microscope is optional and may not be necessary. Also it is possible to employ an objective lens between the microscope 102 and the beam splitter 50 in which case the spherical mirror 100 can be eliminated and the beam splitter rotated ninety degrees.

Figure 5A:
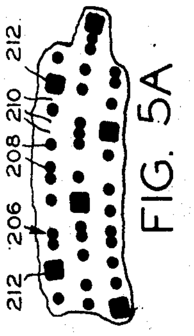
FIG. 5A is an enlarged view of a portion of the record element of FIG. 5.
Figure 5:
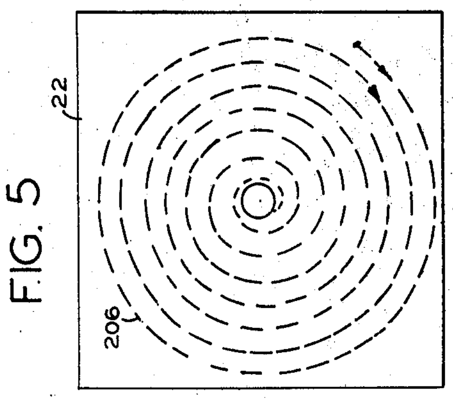
FIG. 5 is a plan view of one embodiment of a photographic record element having a spiral track of digitally encoded spots thereon, which is produced by the apparatus of FIG. 2.

During the recording operation of the apparatus of FIG. 2, the carriage 60 is moved downward into the lower position so that light source 46 is in alignment with the aperture in mask 98, and switch 54 is moved to the "record" position to energize such light source and to turn off playback light source 52. In addition, switch 64 is moved to the record position R to connect the electronic shutter 62 to the analog to digital converter 24, so that digitally encoded pulses are applied to such shutter through amplifier 29 to provide a plurality of light pulses. These digitally coded light pulses are transmitted to beam splitting mirror 50, which reflects approximately 50 percent of the light to the spherical mirror 100, which focuses and again reflects this light to transmit 25 percent of the light through beam splitter 50 onto the scanning mirror 78. The light pulses are then reflected by the scanning mirror 78 onto the photosensitive element which in this case would be the photomaster 20 in place of the photocopy 22 shown. The scanning mirror 78 is rotated about the axis of shaft 70 when a switch 104 is moved to the "record" position to connect the magnetic clutch 74 to the ord" position to connect the magnetic clutch 74 to the movable contact of a potentiometer 106 whose end terminals are connected between a positive D.C. voltage source and ground. The movable contact potentiometer 106 is adjusted automatically, such as by means of an electric motor 108, to gradually increase the speed of rotation as the light beam is deflected radially inward on the photosensitive element. This radial deflection is accomplished when a switch 112 is in the record position R connecting the coil 88 to the movable contact of another potentiometer 110 whose end terminals are connected to a source of positive D.C. voltage and ground. The movable contact of potentiometer 110 may also be coupled to motor 108 to gradually increase the current flowing through coil 88 causing the scanning mirror 78 to be deflected radially inward due to the increased magnetic field. In addition, the centrifugal force on weight 90 caused by the increase in speed of rotation also tends to cause a radially inward deflection of the scanning mirror. As a result the optical scanner 44 provides a radial scan on the photosensitive element and the light pulses are recorded as a single spiral track of digitally coded light spots which are positioned in series, each successive spot being a greater distance along such track, as shown in FIGS. 5 and 5A. It should be noted that potentiometers 106 and 110 must provide a smooth changing control voltage to the magnetic clutch and the deflection coil so that wire wound potentiometers are not suitable, but a continuous resistance layer potentiometer may be employed. Also the resistance of such potentiometers may vary in a nonlinear fashion.

During the playback operation of the apparatus of FIG. 2 switch 54 is moved to the "playback" position to turn on the playback light source 52 and turn off recording light source 46. Also switch 64 is moved to the playback position P to disconnect shutter 62 from amplifier 29, and carriage 60 is moved upward into the position shown to locate the photocell 48 in alignment with the aperture in mask 98. Switches 104 and 112 are also moved to the playback positions shown. The light image of the spots on photocopy 22 are reflected from scanning mirror 78 though beam splitter 50 onto the spherical mirror 100, which reflects and also focuses such image back onto the beam splitter 50, such beam splitter again reflecting the light image through microscope 102 onto photocell 48.

The photocell converts the light pulses into digitally encoded electrical pulses of current which are transmitted to ground through a load resistor 114 connected to the anode of the photocell. The digital voltage pulses thus produced across resistor 114 are transmitted to the readout circuit 36 and to a deflection control circuit.

The deflection control circuit includes an operational amplifier 116, such amplifier having a negative voltage feedback network 118 which is tuned to twice the frequency ($f_1$) of a tracking oscillator 120 whose function is hereafter described. The input of operational amplifier 116 is connected through a coupling capacitor 122 to photocell 48, and the output of such amplifier is connected to one input of a phase comparator 124 whose other input is connected to the output of tracking oscillator 120. The analog output signal of the phase comparator 124 is transmitted through an integrator circuit 126 to one input of a summing network 128, whose other input is connected through a coupling resistor 130 to the output of the tracking oscillator 120. The output signal of the summing network 128 is transmitted through an amplifier 132 and switch 112 to coil 88 during playback. Since the average amplitude of digital pulses integrated by the tuned feedback network transmitted to integrator 126 varies as the scanning mirror 78 moves across the track, the output voltage of the integrator 126 also varies which changes the control voltage applied to coil 88 causing gradual radially inward deflection of the scanning mirror 78 so that the mirror 78 follows the track.

The speed of rotation of the scanning mirror 78 is controlled by the output signal of a differential amplifier 134 which is applied to magnetic clutch 74 in the "playback" position of switch 104. One input of the differential amplifier is connected to the movable contact of potentiometer 136 whose end terminals are connected between a source of positive D.C. voltage and ground. The other input of the differential amplifier is connected across an integrating capacitor 138 whose plates are connected between the cathode of a coupling diode 140 and ground. The anode of diode 140 is connected to the output of a sync bit detector 142 forming part of the readout circuit 36. The sync bit detector 142 has its input connected to the output of photocell 148 and produces a sync output pulse when such a sync pulse occurs in the output signal of such photocell, such sync pulse being of larger amplitude than the digitally encoded pulses. These sync pulses are integrated by capacitor 138 and the resulting varying voltage is applied as the control voltage to the input of differential amplifier 134, so that the speed of rotation of shaft 70 gradually increases as the scanning mirror 78 is radially deflected inwardly in order to maintain the sync bit rate constant.

The sync pulses are produced by sync light spots recorded on the photocopy 22 between the groups of digitally encoded spots to separate such groups or words. These sync light spots may be approximately twice the diameter of the digitally encoded spots and are recorded by applying a larger voltage pulse to the electronic shutter 62 to cause more light to be transmitted through such shutter.

In order to maintain the scanning mirror locked onto the spiral track of light spots on the record element 22, the tracking oscillator 120 adds a small amplitude sine wave tracking signal to the deflection control signal applied to coil 88. The tracking signal causes the scanning mirror to oscillate back and forth across the track at a low frequency $f_1$, for example, about 1 cycle per 100 words or 30 to 70 oscillations per revolution, as such scanning mirror moves along the track. This produces a correction signal which is combined with the deflection control signal in the output signal of photocell 48, such correction signal being filtered by capacitor 122 and amplifier 116, 118 to smooth out the bit current pulses and provide the correction signal with a frequency $2f_1$ which is equal to twice the frequency of the tracking oscillator 120 due to the fact that the scanning mirror crosses the track twice for each cycle of the sine wave output signal of the tracking oscillator. This correction signal is compared with the output signal of the tracking oscillator in phase comparator 124 and if these two signals are not in phase, which indicates that the mirror has started to go off the track, the output voltage of the integrator 126 is automatically changed to position the scanning mirror back on the track.

The readout circuit 36 includes a bistable multivibrator 144 whose input is connected to the output of the photocell 48 in common with the input of the sync bit detector 142. Such bistable multivibrator may be of the Schmitt trigger type which is triggered on the leading edge of each digital pulse and reverted by the trailing edge of such pulse to produce a rectangular output pulse which is transmitted to a shift register 146. A free running bit clock pulse generator 148 is provided with its input connected to the output of the sync detector 142 to synchronize such bit clock with the sync pulses. The output of the bit clock is connected to the shift register 146 to transmit shift pulses to the shift register of the same frequency as the digital encoded signal produced by photocell 48. Once a "word" or group of digital pulses has been received by the shift register 148, they are transmitted to a storage register 150 through a transfer gate 152 which is normally nonconducting and is rendered conducting by a sync pulse applied to the transfer gate from the sync bit detector 142. The output of the storage register 150 is connected to the input of the digital to analog converter 38 which converts the digital signal into the analog output signal, such analog output signal being transmitted through amplifier 40 to the output terminal of the system. As stated previously, the analog output signal is an accurate reproduction of the analog input signal applied to converter 24.

Figure 4:
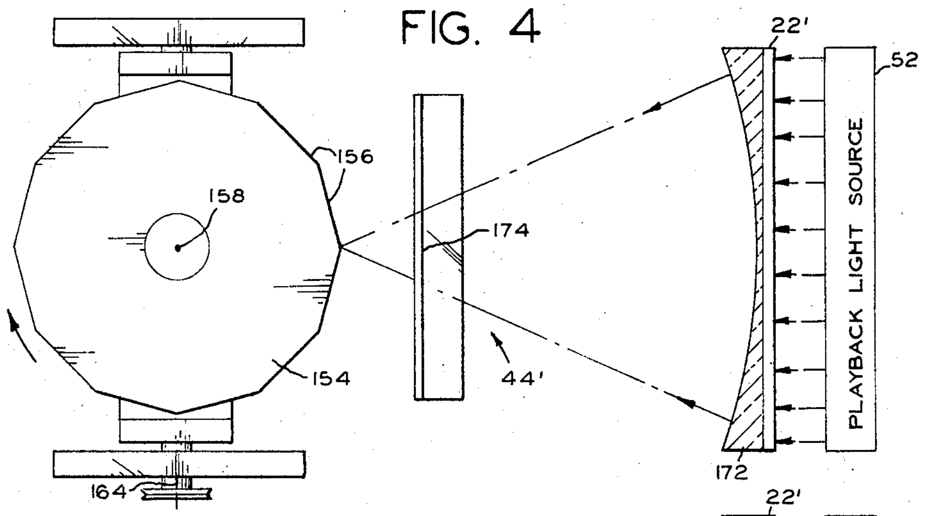
FIG. 4 is a plan view looking at the top of the optical scanner apparatus of FIG. 3.
Figure 3:
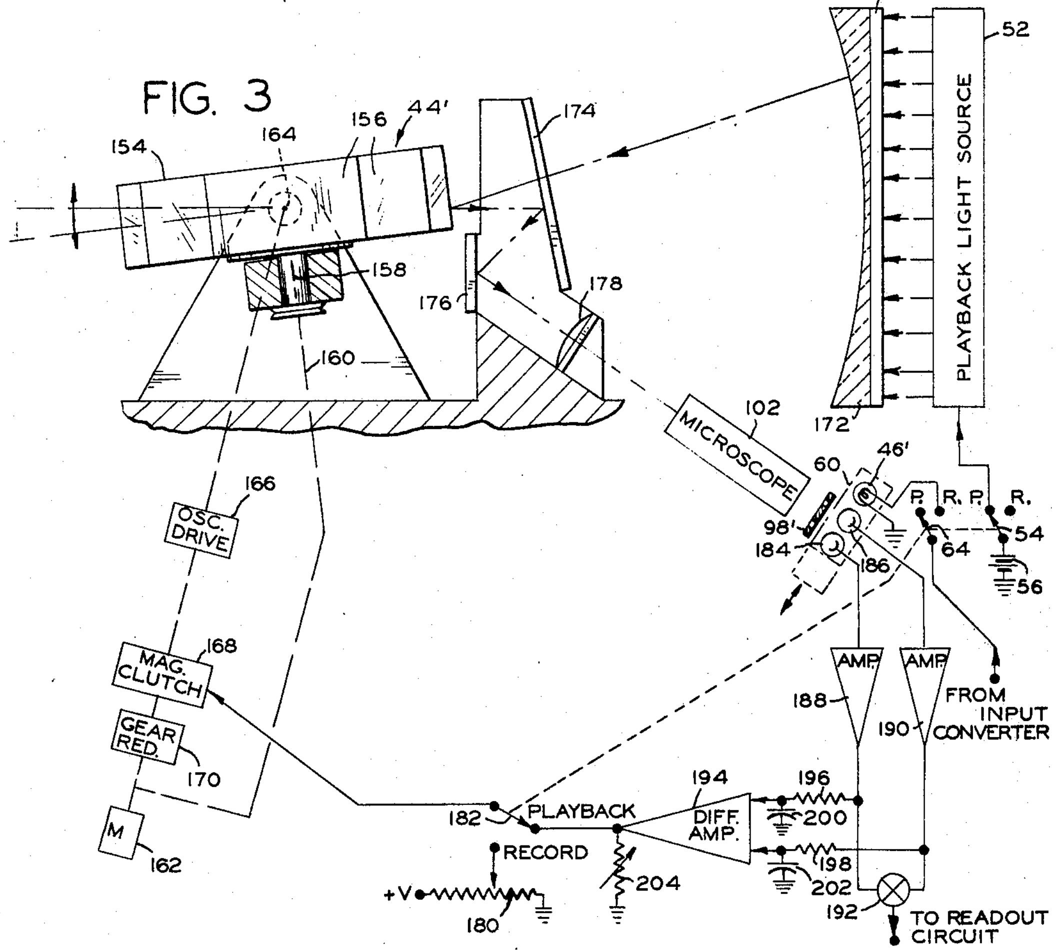
FIG. 3 is a partially schematic view of another embodiment of the system of FIG. 1, which employs an optical scanner having a mechanically oscillated rotating polygon mirror.

Another embodiment of the recording and playback system of the present invention is shown in FIGS. 3 and 4. The optical scanner 44' employed in this embodiment includes a polygon mirror 154 which may be provided with twelve flat mirror surfaces 156 radially spaced uniformly about the axis of rotation 158 of such polygon mirror. The polygon mirror 154 is rotated continuously in a generally horizontal direction about the vertical axis 158 by a direct drive 160 coupling such mirror to an electric motor 162. In addition the polygon mirror is oscillated in a generally vertical direction about a horizontal axis 164 by means of an oscillating drive 166 connecting such mirror to motor 162 through a magnetic clutch 168 and a gear reducer 170. A flat image field corrector plate 172 in the form of a negative lens is positioned in front of the photocopy 22 to compensate for the changes in scanning distance between the mirror segments 156 and such photocopy during scanning. Thus the correction plate is provided with a greater thickness adjacent its outer edges to compensate for the greater scanning distance between the mirror segments and the outer edge of the photocopy 22. A beam splitter 174 is positioned between the field corrector 172 and the polygon mirror 154. Another mirror 176 is positioned in the light path between the beam splitter 174 and the microscope 102. An objective lens 178 is employed between mirror 176 and the microscope, in place of the spherical mirror 100 of the embodiment of FIG. 2 for focusing.

Figure 6:
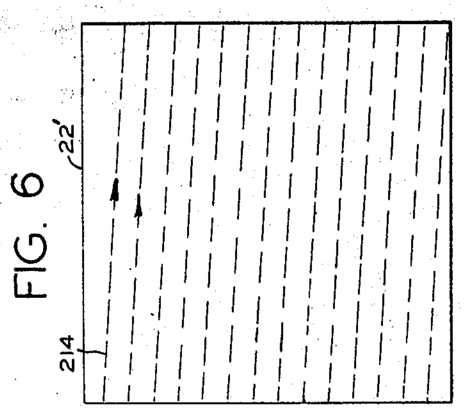
FIG. 6 is a plan view of another embodiment of a photographic record element having a rectangular raster track of digitally encoded light spots thereon which is recorded by the apparatus of FIGS. 3 and 4.
Figure 6A:
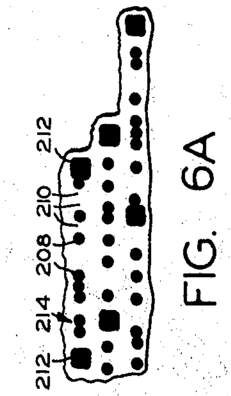
FIG. 6A is an enlarged view of a portion of the record element of FIG. 6.

The apparatus of FIGS. 3 and 4 operates in a similar manner to that of FIG. 2 during recording except that the polygon mirror provides a rectangular scan to produce the sequential straight line raster track shown in FIGS. 6 and 6A. Thus magnetic clutch 168 is connected to the movable contact of potentiometer 180, whose end terminals are connected between a positive D.C. voltage source and ground in the "record" position of switch 182. It should be noted that a fixed setting of the movable contact potentiometer 180 determines the vertical scanning speed during recording. In addition, switches 54 and 64 are moved to the record position R to disconnect the playback light source 52 from power supply 56 and to connect the recording light source 46' to the output of the analog to digital converter 24 through amplifier 29. The pulsed light source 46' should be a gas discharge strobe light similar to that employed in photography, or some other light source capable of a high frequency response to enable pulsing.

During playback, the apparatus of FIGS. 3 and 4 operates in a similar manner to that of FIG. 2 except that a pair of photocells 184 and 186 are positioned in alignment with corresponding apertures in mask 98' so that the viewing fields of such photocells are located on the opposite sides of the track of light spots recorded on photocopy 22. The anodes of photocells 184 and 186 are connected through amplifiers 188 and 190, respectively, to the inputs of a summing network 192, whose output is connected to the inputs of the bistable multivibrator and the sync bit detector of the readout circuit 36 of FIG. 2. In addition, the outputs of amplifiers of 188 and 190 are respectively connected to the inputs of a differential amplifier 194 through coupling resistors 196 and 198 and integrating capacitors 200 and 202, respectively. The output of the differential amplifier 194 is connected to the magnetic clutch 168 in the "playback" position of switch 182 to provide a control voltage signal for such magnetic clutch which adjusts the vertical velocity of the polygon mirror to maintain the viewing fields of the detectors 184 and 186 on the opposite sides of the track in order to follow such track. Thus as a scanning mirror segment 156 gets off the track during playback, the output signals of the detectors 184 and 186 will be unequal and will produce a difference signal at the output of differential amplifier 194 which compensates for the error to vertically position the mirror segment back on the track. It should be noted that the D.C. output voltage of the differential amplifier 194 is equal to that of the voltage on the movable contact of potentiometer 180 when the input signals to such differential amplifier are equal, so that the vertical oscillation drive 166 moves the polygon mirror vertically at the same speed as during recording. Adjustment of the D.C. output voltage of the differential amplifier 194 may be achieved by a variable load resistor 204 connected to the output of such amplifier.

As shown in FIG. 5, the photocopy 22 of the record element produced by the apparatus of FIG. 2, has a spiral track 206 of digitally encoded spots including opaque spots 208 recorded by light pulses which may correspond to "one" bits of a binary digital code, and transparent spots 210 which correspond to the "zero" bits of such binary code. The spots 208 and 210 each have a diameter less than approximately .01 millimeter and typically on the order of $\frac{1}{300}$ millimeter. In addition, synchronizing spots 212 are provided on the track between successive word groups of digitally encoded bits. Thus, in the embodiment of FIG. 5A, one word group equals 15 binary bits which in the topmost line of the track consists of 8 transparent spots and 7 opaque spots. The sync spots 212 are approximately twice the diameter of the opaque digital spots 208 and the spacing between the centers of adjacent lines of spots is also equal to approximately twice the diameter of the opaque digital spots 208, so that adjacent sync spots will almost touch.

The rectangular raster track 214 of digitally encoded spots on the photocopy 22' produced by the apparatus of FIGS. 3 and 4, forms a sequential straight line path back and forth across the record element which is scanned as a single track. It should be noted that adjacent lines of such track are sloped downward due to the continuous vertical movement of the polygon scanning mirror 154. Also it should be noted that the top of the next successive line corresponds with the bottom of the preceding line because adjacent lines are scanned by successive mirror segments 156 of the polygon mirror. The size and spacing of the opaque and transparent digitally encoded spots 208 and 210 of FIG. 6A is similar to that of FIG. 5A.

The photosensitive record elements 22 and 22' may be transparent plates of glass or methyl methacrylate plastic having a layer of photosensitive material coated on one side thereof, if the playback light source is to be transmitted through such record elements in the manner of FIGS. 2, 3 and 4. However, if light reflecting photographs are employed, record elements 22 and 22' may be of any suitable dimensionally stable support material such a plastic which is provided with the photograph of the digitally encoded light tracks on its outer surface. A protective coating of plastic may be necessary over such photographs and over any photosensitive coating on a transparent plate to prevent scratching of the records during handling. In addition it is possible that a photosensitive glass can be employed to form the record element without the need for a separate layer of photographic material, such glass being etched after it is exposed to the light pattern of the digitally encoded tracks. The etched spots may be filled with light opaque material. In this connection it should be noted that photochromic materials may also be used.

Other changes in the details of the above-described preferred embodiments of the present invention will be obvious to those having ordinary skill in the art, without departing from the spirit of the invention. Therefore the scope of the present invention should only be determined by the following claims.

I claim:

1. A signal recording and playback system, comprising:

input means for generating electrical pulses which form a first digital coded electrical signal;

optical recorder means including a single light source supported in a fixed position and connected to said input means so that the pulses of said first digital signal are transmitted in series to said light source for producing a beam of light pulses which form a digital coded light signal corresponding to said first digital signal, and light beam deflection means for scanning said light pulses across a photographic record element supported in a fixed position to produce a photo record of said digital coded light signal in the form of a single series-recorded track of a plurality of small spots representing digital bits recorded at a high density;

optical playback means including at least one light detector supported in a fixed position and light deflection means for scanning the viewing field of said detector continuously along said track across the light image of said recorded spots, said viewing field being limited to approximately the size of one of said spots, for producing electrical pulses which form a second digital coded electrical signal corresponding to the digital light signal recorder on said photo record; and output means connected to said light detector for transmitting substantially all of the pulses of said second digital signal from said detector through the same connection circuit to said output means.

2. A system in accordance with claim 1 in which the input means includes a source of analog input signals and a first converter means for converting the analog input signal into said first digital signal, and the output means includes a second converter means for converting said second digital signal into an analog output signal which is a reproduction of said analog input signal.

3. A system in accordance with claim 1 in which the light pulses are emitted from a single source of small size and the recorder means includes means for focusing the light pulses to a small focal spot of less than about .01 millimeter in diameter on a photographic film to enable the bit spots to be recorded at density greater than about $10^6$ bits per square inch.

4. A system in accordance with claim 1 in which the light pulses are emitted by a laser.

5. A system in accordance with claim 1 in which the single series-recorded track of digital coded spots is of a spiral shape.

6. A system in accordance with claim 1 in which the single series-recorded track of digital coded spots follows a sequential straight line path to form a rectangular raster pattern.

7. A system in accordance with claim 1 in which the track includes synchronizing spots between the word groups of spots.

8. A system in accordance with claim 1 which also includes copy means for making a plurality of photographic copies of said photo record, and in which the optical playback means scans one of said copies to produce said second digital signal.

9. A signal recording apparatus, comprising:

input means for generating electrical pulses which form a digital coded electrical signal;

a light source supported in a fixed position and having a single light emitter and connected to said input means so that substantially all of the pulses of said digital signal are applied in series to said light source for producing a beam of light pulses which form a digital coded light signal corresponding to said digital electrical signal;

means for focusing said light pulses; and light beam deflection means for scanning said light pulses across a photographic record element supported in a fixed position to produce a photograph of said digital light signal in the form of a single series-recorded track of a plurality of spots representing digital bits recorded at a high density.

10. Recording apparatus in accordance with claim 9 in which the input means includes a source of analog input signals and a converter means for converting the analog input signal into said digital electrical signal.

11. Recording apparatus in accordance with claim 9 in which the light source includes an electronic shutter which is connected to said input means to produce the light pulses.

12. Recording apparatus in accordance with claim 9 in which the light emitter is a laser.

13. Recording apparatus in accordance with claim 9 in which the means for focusing produces a light spot of less than .01 millimeter in diameter in the photosensitive element.

14. Recording apparatus in accordance with claim 9 in which the means for scanning includes a rotating mirror supported on a leaf spring fixed at one end to a rotatable support at a position spaced from the axis of rotation of said support, motor means for rotating said support about said axis, and magnetic deflection means for bending said spring to radially deflect said mirror in response to an electrical control signal to provide a spiral shaped scan track for said mirror.

15. Recording apparatus in accordance with claim 14 in which the photographic record element is a flat sheet of photographic film and said mirror is supported to move away from said film as said mirror is deflected radially inward in order to maintain substantially the same optical path length between the light emitter and the film during scanning.

16. Recording apparatus in accordance with claim 15 in which a weight is secured to the free end of the spring on the opposite side of the axis of rotation from the fixed end of said spring to cause deflection of the spring by centrifugal force, and said motor means includes means for varying the speed of rotation of the mirror support so that said speed increases as said mirror is deflected radially inward.

References Cited

UNITED STATES PATENTS

| | | | |
|---|---|---|---|
| 3,314,075 | 4/1967 | Becker et al. | |
| 3,324,237 | 6/1967 | Cherry et al. | |
| 3,337,718 | 8/1967 | Harper et al. | |
| 3,365,706 | 1/1968 | King. | |
| 3,370,504 | 2/1968 | Buck et al. | 178—6.7 |
| 3,422,219 | 11/1969 | Teeple | 178—15 |
| 3,391,247 | 7/1968 | Frohbach | 178—6.6 |

OTHER REFERENCES

Large-Capacity Memory Techniques for Computing Systems, pp. 373–375, The Macmillan Company, edited by Marshall Youits.

Optical Processing of Information, Spartan Books Inc., edited by D. Pollock, C. Koester, J. Tippett, pp. 181–182.

JOHN W. CALDWELL, Primary Examiner

D. E. STOUT, Assistant Examiner

U.S. Cl. X.R.

178—15, 30; 250—219; 340—173; 346—108

PO-1050
(5/69)

UNITED STATES PATENT OFFICE
CERTIFICATE OF CORRECTION

Patent No. 3,501,586 Dated March 17, 1970

Inventor(s) JAMES T. RUSSELL

It is certified that error appears in the above-identified patent and that said Letters Patent are hereby corrected as shown below:

Column 1, line 29, "apparauts" should read --apparatus--; line 63, "3,138,699" should read --3,138,669--. Column 2, line 22, "$10^{-7}$" should read --$10^{+7}$--; line 27, "producee" should read --produces--. Column 3, lines 44 and 45, "retrival" should read --retrieval--; line 59, "photograph" should read --phonograph--. Column 4, line 19, after "track" insert --of--. Column 5, line 46, "caviy" should read --cavity--. Column 6, line 32 should be canceled. Column 10, line 11, "a" should read --as--.

SIGNED AND SEALED
AUG 4 - 1970

(SEAL)
Attest:

Edward M. Fletcher, Jr.
Attesting Officer

WILLIAM E. SCHUYLER, JR.
Commissioner of Patents